United States Patent [19]

Verkindt et al.

[11] Patent Number: 4,991,640

[45] Date of Patent: Feb. 12, 1991

[54] FASTENING MEANS FOR FASTENING A FLEXIBLE SHEET TO A BODY

[75] Inventors: Glenn M. Verkindt, Erin Township; Edward A. Lockhart, Brampton; Douglas J. Plester, Dundalk, all of Canada

[73] Assignee: Ontario Limited D/B/A G.M. Associates, Bramalea, Canada

[21] Appl. No.: 453,735

[22] Filed: Dec. 20, 1989

Related U.S. Application Data

[63] Continuation-in-part of Ser. No. 187,800, Apr. 29, 1988, abandoned.

[51] Int. Cl.⁵ ............................................. B60P 7/02
[52] U.S. Cl. ................................. 160/368.1; 160/383; 296/100
[58] Field of Search .............. 160/368.1, 354, 370.2, 160/383; 296/100

[56] References Cited

U.S. PATENT DOCUMENTS

| | | |
|---|---|---|
| 3,334,736 | 8/1967 | Cole et al. |
| 3,538,914 | 11/1970 | Meyers . |
| 3,721,467 | 3/1973 | Kerr . |
| 4,036,521 | 7/1977 | Clenet . |
| 4,094,021 | 6/1978 | Rapp . |
| 4,209,197 | 6/1980 | Fischer . |
| 4,272,119 | 6/1981 | Adams . |
| 4,418,954 | 12/1983 | Buckley . |
| 4,600,233 | 7/1986 | Boydston . |
| 4,606,573 | 8/1986 | Schneider . |

Primary Examiner—Blair M. Johnson
Attorney, Agent, or Firm—Rogers & Scott

[57] ABSTRACT

A fastening system is provided that is especially suitable for securing flexible automotive and truck body covers, and in particular tonneau covers, to truck bodies. The system employs cooperating hook and loop type fasteners with a cover member that protects the hook and loop fasteners against weathering, entry of moisture dirt, etc., and also provides an enclosure along the cover edge to prevent peeling separation under the effect of wind whip. The system can also include a locking closure to prevent unauthorized removal of the cover. Preferably a strip of hook and loop fastening material is mounted on a replaceable strip mounted in a channel in an extruded base member which is bonded to the vehicle side upper edges; a resilient layer can be interposed to accomodate irregularities. A second hook and loop strip is fastened to the underside of the cover member which is pivotably attached to the base member. Cooperating hook and loop strips are attached to the opposite side edges of the tonneau cover which are sandwiched between the base and cover members to fasten the edges. When the tonneau cover is absent the hook and loop fasteners hold the members together and continue to prevent deterioration and also rattling. The base member preferably is in the form of short butting strips which are held in alignment by the replaceable strip and the cover member, both of which are continuous. The locking closure consists of a front attachment hidden by the tonneau cover and straps attached to the rear edge and secured in locking fasteners.

24 Claims, 3 Drawing Sheets 4,991,640

FASTENING MEANS FOR FASTENING A FLEXIBLE SHEET TO A BODY

CROSS REFERENCE TO RELATED APPLICATION

This application is a continuation-in-part of our prior application No. 07/187,800, filed 29 April 1988, now abandoned.

FIELD OF THE INVENTION

The present invention relates to fastening systems for fastening a flexible sheet to a body, more particularly to such systems for fastening covers to automotive and truck bodies, and in particular for securing tonneau covers to pick-up truck bodies.

REVIEW OF THE PRIOR ART

In the past flexible covers for both commercial and pick-up trucks generally have been held in place with either tie-down ropes or rubber shock-cords, both of which are fastened through grommets placed around the edges of the cover. This form of attachment is flexible in that it allows the cover to be secured in place over irregularly shaped cargo. Fitted tonneau covers have become increasingly popular for pick-up trucks as they are used in place of conventional automobiles, and are designed to extend flat across the upwardly-open rectangular body. These covers therefore do not require the flexibility of a rope tie down system, and in practice the tie down attachment is found to have disadvantages. For example, when the vehicle is travelling at speed the edges of the cover flap in the wind that is generated, so that the rope tends to tear the grommets from the sheet and then tear the edges of the sheet; in addition the grommets are banged against the truck sides which creates unnecessary noise and can damage the vehicle's finish.

An advance over tie-downs to secure fitted tonneau covers was the use of dome fasteners. Because of their comparatively low cost a large number can be used closely-spaced to secure all four sides of the cover. One half of each fastener is screwed by a self-tapping screw to the vehicle body, while the other half is punch-pressed into the cover. They therefore provide a relatively simple method for attaching covers, but corrosion is often found to be a problem around the screw holes where the anti-corrosion protection is removed; this is especially true in areas where salt is used for de-icing roads and gets on to the body. Another problem is that the installation of the dome fasteners on both the cover and vehicle body must be done very precisely, in that they provide no adjustment once installed, and it is not possible to provide for adjustment as the cover inevitably stretches in use.

Hook and loop fasteners, such as "Velcro" (Trade Mark) fasteners, are widely used for fastening two flexible sheets together, or for fastening a flexible sheet to a rigid member, particularly where the junction between them needs to be adjustable, and usually are made up of two plastic or fabric strips, one of which has a large plurality of closely spaced short loops on its operative side, while the other has a corresponding large plurality of closely-spaced resilient hooks on its operative side. When pressed together in a junction plane the hooks catch in the loops to provide a gripping fastening action. Such fasteners are weakest when subjected to forces pulling the strips apart in a direction normal to the junction plane and strongest when subjected to shear forces parallel to the plane.

Hook and loop fasteners are readily commercially available with adhesive backing suitable for attachment directly to both the painted surface of a truck body and the surface of a vinyl tonneau cover. U.S. Pat. No. 4,272,119 discloses their use for securing a tonneau cover over the open cargo area of a pick-up truck; one of the hook and loop strips is attached to the horizontal top surfaces of the pick-up body walls and the other to the underside of the cover around its edges. When used to secure tonneau covers such fastening means have the advantage that they are quick, easy to apply, and do not damage painted surfaces, so that the corrosion encountered with snap fasteners is not a problem. They also provide a small amount of lateral adjustment making installation less critical than for dome fasteners, and also provide some adjustment for subsequent stretching.

One of the inherent problems of hook and loop fasteners in this and like applications is that in order to be operable they must be made of flexible plastic material, which is easily permanently damaged by physical contact, as by loading and unloading heavy objects over the edges of the body, and which degrades when subjected to the actions of water and sunlight, resulting in a quite rapid loss of holding power. The holding power can be increased by increasing their width, but a limition is imposed by the relatively narrow width of the flat central parts of the truck body edges. Owing inherently to their structure these fasteners tend to retain dirt and moisture (rain, snow and ice) that is deposited on them and this can easily accumulate sufficiently to interfere with secure fastening at the location of the deposit; once formed such deposits are difficult to remove without damage to the hooks and loops. The result is that even if new hook and loop fasteners will hold a tonneau cover sufficiently securely, their holding power quickly drops as much as 50% after being subjected to sunlight and general weathering. It is found both with hook and loop fasteners and others that the wind whip forces on the cover created while travelling at highway speeds will start to peel the edges of the cover away from the truck body edges admitting such moisture and dirt. Moreover, once the cover has separated at one point the consequent local reduction in holding power together with the vertical movements of the cover will rapidly increase the separation until it is complete. Security of the load carried underneath such a cover has not been addressed by any of the preceeding methods for securing covers known to us.

DEFINITION OF THE INVENTION

The principal object of the present invention is to provide a new fastening system, especially suitable for securing automotive and truck body covers, which system provides elements which are of attractive appearance, simple to use, relatively easy to install, and with the holding power protected against rapid deterioration by physical damage, sunshine and general weathering.

In accordance with the present invention there is provided a fastening system for securing a flexible sheet to a body, the system comprising:

a base member;

a cover member connected to said base member for movement between closed and open positions, the cover member in the closed position overlying and covering the base member; and a sheet member having an edge portion thereof adapted to be sandwiched between said base and cover members when the cover member is in the overlying closed position, with one edge portion surface contacting the base member and the opposite edge portion surface contacting the cover member;

wherein the sheet member edge portion carries on its opposite surfaces respective hook and loop fastening means, and the base and cover members carry respective hook and loop fastening means cooperating with the respective hook and loop fastening means on the respective contacted sheet member surfaces;

the cover member in the overlying closed position with the sheet member edge portion sandwiched between the base and cover members covering the hook and loop fastening means on the cover member, the sheet member edge portion, and the base member for protection of the sandwiched cover edge portion and the hook and loop fastening means against physical damage and the deleterious effects of weathering;

the hook and loop fastening means on the cover member and the base member fastening to one another in the absence of the sheet member between them to hold the cover member in close overlying covering engagement with the base member, so that the cover member then protects the hook and loop fastening means on the cover and base members against physical damage and the deleterious effects of weathering.

DESCRIPTION OF THE DRAWINGS

A particular preferred embodiment of the invention will now be described, by way of example, with reference to the accompanying diagrammatic drawings wherein.

DESCRIPTION OF THE PREFERRED EMBODIMENTS

Figure 4:
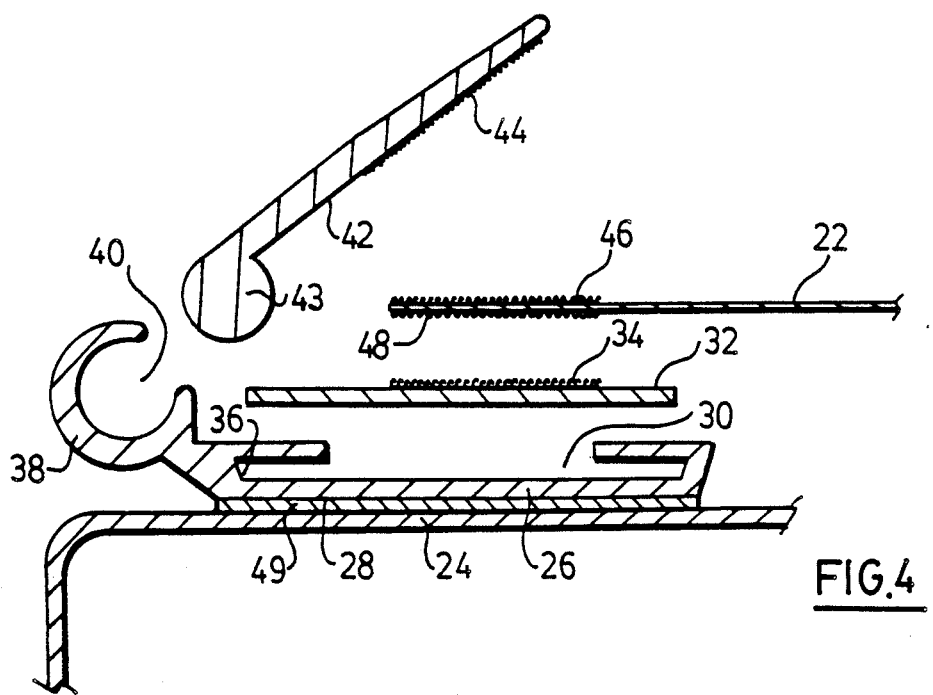
FIG. 4 is an exploded cross-section taken on the line 4—4 in FIG. 1 of the components of the fastening system.
Figure 5:
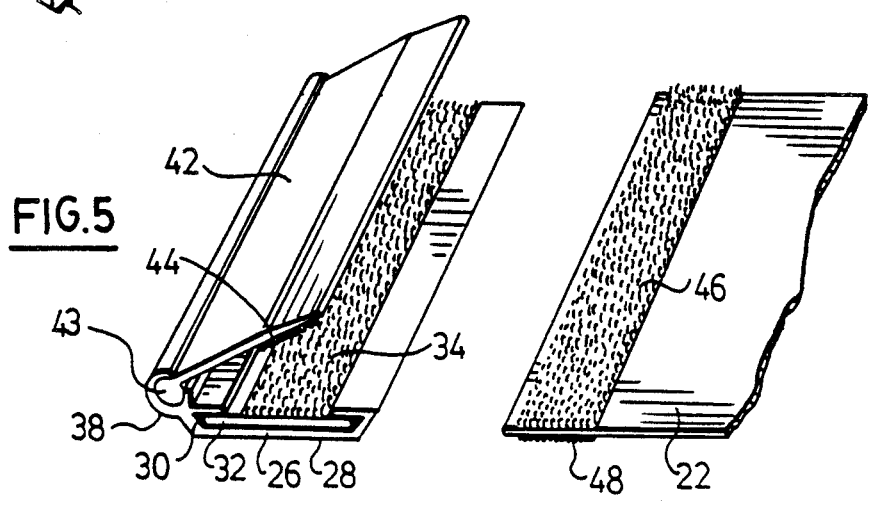
FIG. 5 is perspective view of the system in assembled condition with the cover member in open position and ready to grip the edge of a tonneau cover.
Figure 6:
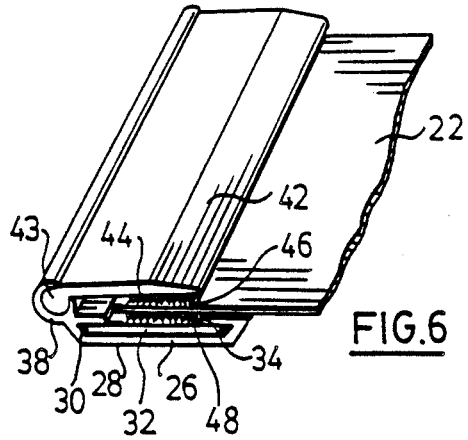
FIG. 6 is a similar view to FIG. 5 showing the cover member in closed position.

The fastening system of the invention is illustrated in FIGS. 1–6, 8 and 9 in its specific application as fastening means 20 to hold the two longer sides of the four sides of a pick-up tonneau cover 22 on the horizontal upper edge surfaces of the sides of a pick-up truck body 24. In other embodiments it can be used to fasten three or all four of the sides, as will be apparent from the description below. From this description of this specific application its application to other uses will readily be apparent. Referring specifically to FIGS. 4–6, the fastening system comprises an elongated base member 26, preferably an extrusion of plastic or metal, having a flat lower surface 28 suitable for application to the corresponding flat surface to which it is to be secured, in this embodiment the upper edge surface of the pick-up truck side wall 24. The base member is provided at its parallel upper surface with an open-mouthed rectangular cross-section recess 30 adapted to receive and retain an elongated flat subsidiary base member 32 of corresponding cross-section, which is a snug sliding fit within the recess. The subsidiary base member carries on its upper surface an elongated strip of hook and loop fastening material 34 (in this embodiment hook material) of width just less than that of the recess mouth 36, so as to be accessible through that mouth.

One edge 38 of the base member is formed to extend above the remainder of the member and is provided with an elongated open-mouthed groove 40 of circular transverse cross-section. A flat cover member 42 of rectangular cross-section has its corresponding edge 43 of circular cross-section and of a size to fit within the groove 40 and to be rotatable smoothly therein, so that the cover member can pivot from an open position shown in FIG. 5 to a closed position shown in FIG. 6 in which it overlies and fully covers the base member. The cover member is provided on its surface facing the base member with an elongated strip 44 of hook and loop fastening material, which in this embodiment is loop material, so that it can cooperate to hold the cover securely in the closed position in the absence of the sheet to be retained. The edge portion of the sheet 22 that is sandwiched between the base and cover member so as to be retained thereby is provided on both of its opposite surfaces with respective strips 46 and 48 of hook and loop fastening material, strips 44 and 46 cooperating together to fasten to one another and strips 48 and 34 cooperating together to fasten to one another.

In use, the fastening means is secured in place on the vehicle body edges, preferably using an intervening relatively thick flat resilient member 49 coated on both sides with a suitable adhesive, the base member being oriented so that the channel 30 faces upward and the circular groove 40 is disposed on the outside of the wall, further from the tonneau cover and the truck well. The subsidiary base member 32 preferably takes the form of a plastic strip that is stiff but coilable for storage and transport and to which the layer 34 has been bonded. If this is not already in place it is slipped inside the channel 30 with the hooks facing up. The loop-type strip 44 is bonded to the lower face of the cover member 42, the member being slid or snap-fitted into the circular groove 40.

The cover is secured in place by engaging the lower tonneau cover hook and loop strip 48 with the base hook and loop strip 34 and then swinging the cover member down to engage the hook and loop strip 44 with the strip 46. The cover is thus secured against detachment by two separate equal hook and loop fasteners, with the edge junction between the cover and the fastening completely enclosed and protected against wind whip buffeting and separation by the wind generated by the vehicle's movement. The avoidance of such separation is also facilitated by the sandwiching of the cover edge portion between two opposed balanced fasteners, instead of the unidirectional fastening of a single hook and loop combination. For example, it is found that rain can collect as a pool in the centre of the cover, often to a weight as much as 200 Kg (400 pounds), whereupon a peeling moment is applied to the cover edges tending to peel open the fasteners; such a peeling moment is ineffective with the system of the invention, especially since the peelable edge is sandwiched between the cover and base members adjacent the pivot joint where the possibility of vertical movement is zero.

The cover member protects the remainder of the fastening means against the deleterious effects of dirt, sunlight, snow, ice, weather etc., and is easily replaceable if it is damaged or deteriorates too much, without requiring expensive removal or replacement of the base member. Similarily, if the lower strip 34 becomes damaged, or deteriorates until it is no longer secure, it can easily be replaced by sliding out and replacing the strip 32.

When the tonneau cover is not in use the cover member swings down to engage the strips 34 and 44 together, when it completely and securely covers the base hook and loop strip 34 to prevent physical damage, and weathering, dirt and ice retention and sunlight degradation. It will be seen therefore that this double hook and loop cover closure system has major advantages over the prior art structures.

Firstly, damage and degradation of all the hook and loop strips, or the possibility of them filling with water, ice debris, etc. is greatly reduced as they are always covered and protected, even when the tonneau cover is not in use, when the base strips on the side edges would otherwise be completely exposed.

Secondly, the edge of the tonneau cover is completely enclosed to prevent lifting and peeling of the tonneau cover away from the base hook and loop strip due to edge whip and flutter by wind action, particularly at high vehicle speeds; such action is particularly severe with tonneau covers of plastics materials which have relatively little give or elasticity to mitigate this effect.

Thirdly, apart from its extreme vulnerability to physical damage with consequent onus on the vehicle owner for care in loading and unloading, a base strip of hook and loop material is not generally particularly decorative, as contrasted with the smooth damage-resistant external contour that can be provided with the system of the invention. Since the base and cover members are protective in function there is much more flexibility in the choice of material, surface decoration, colour, etc. than with the hook and loop elements where the physical retention characteristics are paramount.

Fourthly, by providing hook and loop attachment means on both edge surfaces of the tonneau cover the gripping area and hence the holding power can be doubled without the use of a wider more expensive strip.

As described above the effect of sunlight, particularly the ultraviolet component, on the resilient plastic hook and loop elements is to quite rapidly decrease their holding power, and thus is substantially reduced when the elements can always be completely protected by the cover member both with and without the tonneau cover in place. Similarly, the connector elements are protected at all times by the cover member against the entry of water, dirt, ice and snow and their consequent decrease of holding power. Rain and all forms of moisture also have a very deleterious effect on holding power, both directly and indirectly. An indirect action is when water pools on the cover as described above, while a direct action is the wetting of the elements that takes place in rainy conditions; owing to the physical structure of the fastening elements and the density with which they are packed they tend to retain any moisture that enters by surface energy action; the moisture may then remain for extended periods of time, only being removed by evaporation. Attempts to remove the moisture physically are relatively ineffective unless the action is so vigorous as possibly to damage the fastening elements.

The following series of tests (Tables 1 and 2) show very clearly how damaging such moisture retention is to the holding power of these hook and loop fastening materials. In carrying out these tests a strip of looped retaining material of 2.2 cm width (0.875 in) was clamped in relaxed state to a flat board. A strip of hooked retaining material of 1.6 cm width (0.625 in) was engaged with the looped material and pressed into uniform contact therewith using a 2.5 cm (1 in) wide roller. A clamp was attached to one end of the narrower hooked material and connected by a horizontally-extending wire trained over a pulley to a weighted container, so that the weight of the container tended to peel the hooked material form the looped material. Lead shot was added to the container until the separation between the two measured at least 6.25 cm (2.5 in), whereupon the container was weighed. The tests were first carried out with dry "off the shelf" materials and then repeated with materials that had been soaked in water at room temperature for one half hour and one hour respectively.

Table 1 is for "VELCRO" (Trade Mark) material and shows that after only one half hour of such exposure its retention strength had decreased to about 66.3% of its dry value, while after one hour its strength had decreased to only about 37.5% of its original value. Table 2 is for "KARINA" (Trade Mark) material and shows that the respective values are about 55.4% and 44.5%. All weights are in grams

TABLE 1

| | ("VELCRO") | | | | |
|---|---|---|---|---|---|
| Test No. | Dry | ½ Hour | % | 1 Hour | % |
| 1 | 1670.5 | 905.24 | 54.2 | 585.8 | 35.1 |
| 2 | 161.3 | 992.2 | 61.5 | 531.1 | 33.2 |
| 3 | 1361.4 | 1117.5 | 82.1 | 531.0 | 39.0 |
| 4 | 1430.4 | 991.2 | 69.3 | 490.0 | 34.3 |
| 5 | 1273.1 | 821.0 | 64.5 | 582.6 | 45.7 |
| Mean | | | 66.3% | | 37.5% |

TABLE 2

| | ("KARINA") | | | | |
|---|---|---|---|---|---|
| Test No. | Dry | ½ Hour | % | 1 Hour | % |
| 1 | 1388.6 | 1057.5 | 76.2 | 620.0 | 44.6 |
| 2 | 1610.0 | 715.6 | 44.4 | 620.0 | 38.5 |
| 3 | 1307.1 | 660.0 | 50.5 | 537.0 | 41.1 |
| 4 | 1288.9 | 661.0 | 51.3 | 621.0 | 48.2 |
| 5 | 1080.0 | 589.0 | 54.5 | 539.5 | 50.0 |
| Mean | | | 55.4% | | 44.5% |

The tests show clearly the substantial unexpected advantages of the weathering protection provided by the systems of the invention.

The base member 26 is in this application sufficiently stiff that it cannot or should not be bent and preferably therefore it is made in relatively short pieces to facilitate transport and storage. A panel truck of usual size requires, for example, three pieces butted end to end, with the final adjustment in length effected by cutting one end of the last piece put in place. The intermediate member which, as described above, is stiff but coilable, is cut as a single continuous piece which therefore also serves to retain the pieces of base member in alignment. Similarly the cover member 44 is stiff but coilable, is also cut as a single continuous piece, and also acts to retain the pieces in alignment. The use of an intervening relatively thick (e.g. about 3 mm or 0.12 in.) fastening member 29 of resilient material (e.g. a dense plastic foam) is also found to be advantageous in that it accommodates the inevitable minor irregularities in the truck edge wall surface, and because of its resilience, can give sufficiently transversely to prevent sideways creep of the base member on the truck surface under the tension of the cover; such creep is particularly likely in hot weather when the fastening adhesive has softened somewhat.

It will be understood that in this embodiment, because of its particular application, the base member 26 is somewhat rigid, and if made of a metal such as aluminium will be very rigid. However, if the fastening means is used to fasten together two sheets then it will need to be made correspondingly flexible, as will the cover member 42. The hook and loop combinations can of course be reversed, retaining the advantage of cooperating strips 44 and 34, so that together with its protective function the cover member will be held securely to the base member against rattling when the tonneau cover is not in use. It will also be understood that the base member may be made without a separate subsidiary base member 32, and with the lower strip 34 fastened directly thereto. In other embodiments the hinge may be provided by a grooved portion on the cover member, while the beaded portion is provided on the base member. Again, the cover member 42 and the base member 26 with modern extrusion technology need not be separate parts, but can be extruded simultaneously as an integral unit with a hinging connecting portion between them.

Figure 2:
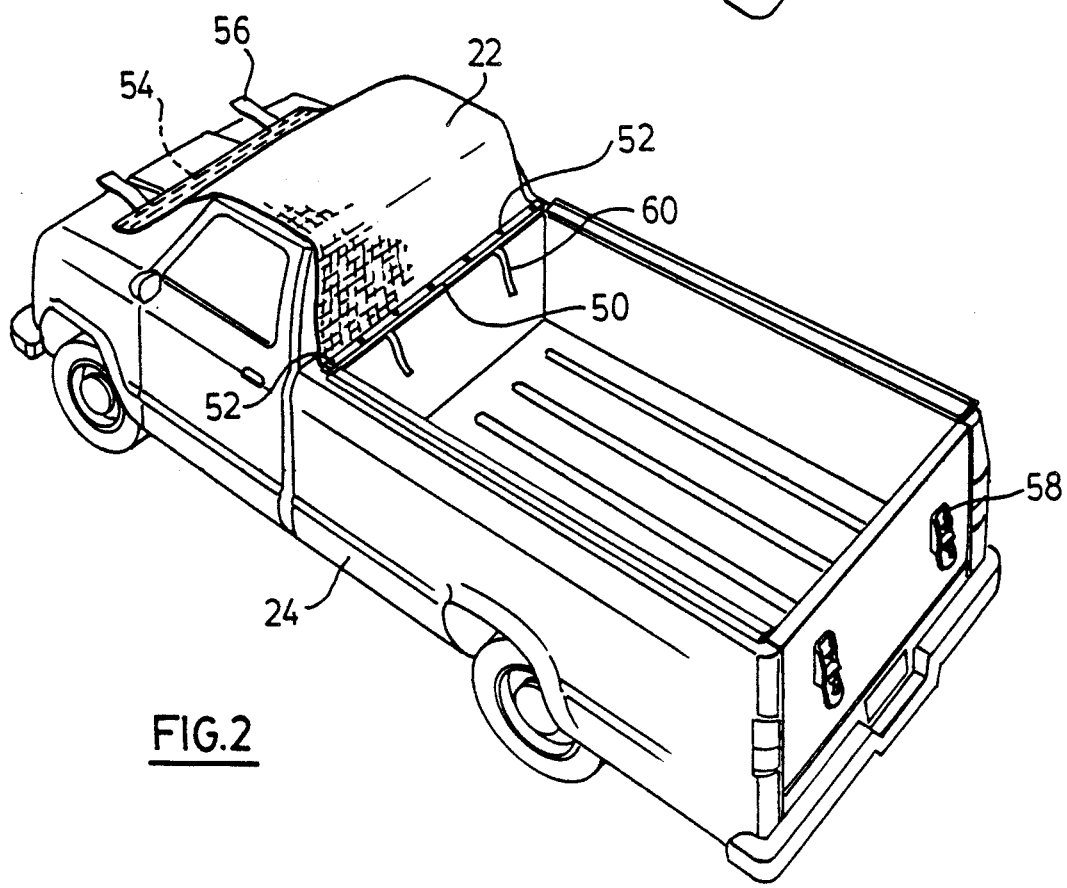
FIG. 2 is a similar view to FIG. 1 showing the tonneau cover folded forward to more clearly illustrate the method of attachment of its front end to the truck body.
Figure 3:
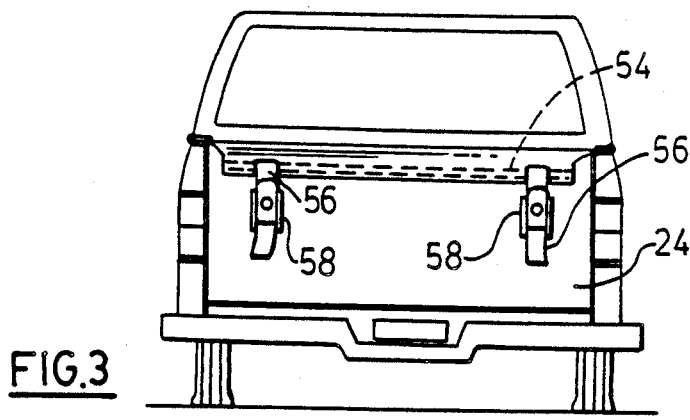
FIG. 3 is a rear view of the pick-up truck showing details of the locking cover closure means.

It will be seen that the fastening means is not able to prevent unauthorized removal of the cover, and in this embodiment a cover locking system is also provided for this purpose; the locking system comprising hidden attachment means for the tonneau cover front edge and locking attachment means for the tonneau cover rear edge. Referring especially to FIG. 2, a front attachment bar 50 is secured by screws 52 to the front body top edge wall with the front edge of the cover trapped between the bar and the body, the cover exiting from under the front edge of the front attachment bar so that it will cover the mounting bar and the screws when it is stretched back to cover the truck bed. This prevents access to the front edge of the cover and prevents the bar from being unscrewed to gain removal of the cover and access to the truck's contents unless the cover is cut for this purpose.

Figure 1:
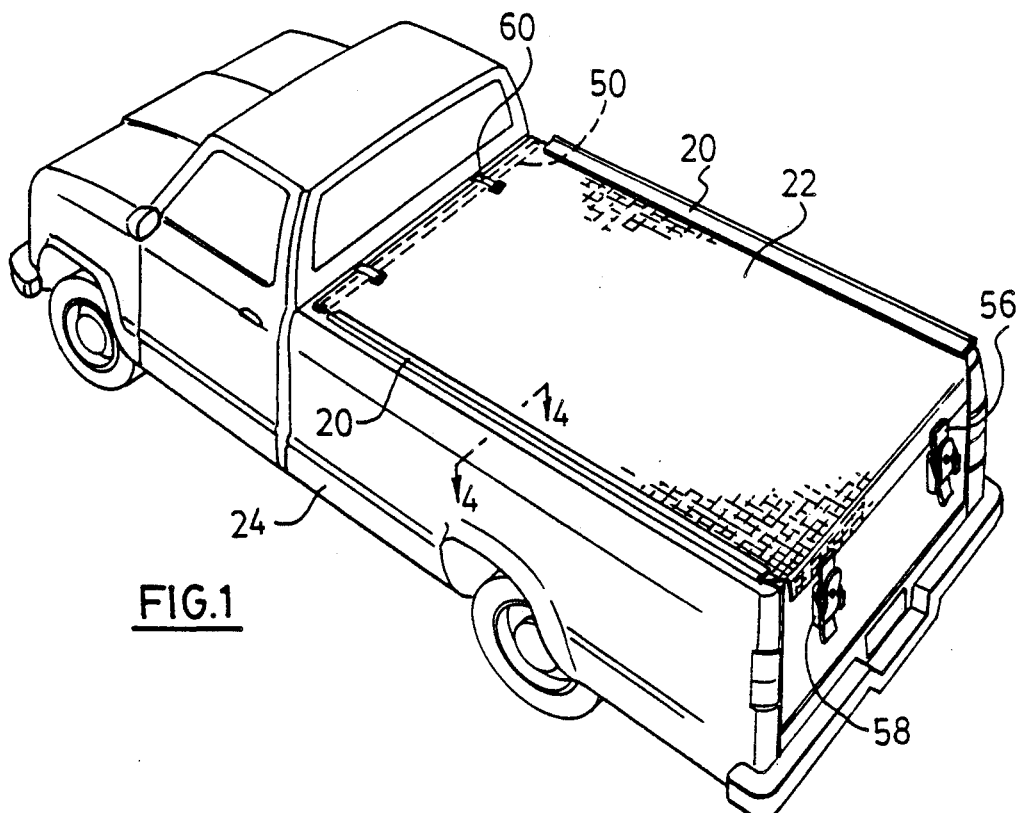
FIG. 1 is a perspective view of an open-body pick-up truck employing the fastening system of the invention on the two longer sides and provided with locking cover closure means at the rear shorter side in order to secure a tonneau cover to the body.

A rear mounting bar 54 is sewn into the rear edge of the cover, to which in turn the looped ends of straps 56 are secured, the rear bar providing a uniform pull across the width of the cover. To lock the cover in place the straps are cinched tight through respective locks 58 mounted on the truck rear end, shown in detail in FIGS. 8 and 9, the locks then being secured. Once the cover has been stretched tight and secured in this manner it is not possible to pull the cover edges far enough aside to gain access to the truck bed, and such access can only be obtained by cutting or tearing the cover. However, a thief does not usually wish to call attention to himself by damaging the vehicle and the level of protection provided by such a locking tonneau cover is equivalent to the protection afforded by a locked car. When not in use this permanently attached cover will be rolled up and tied to the top of the front truck body wall using the supplied tie-down straps 60 (FIG. 1). In an alternative embodiment the tonneau cover front edge is engaged in a longitudinal channel in the bar 50 for retention therein.

Figure 7:
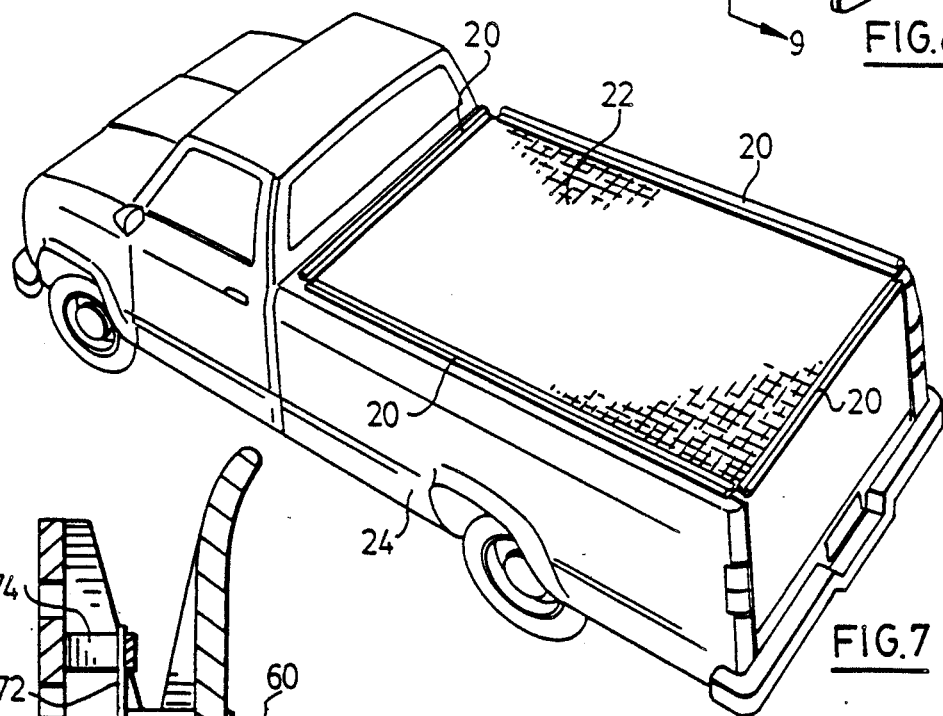
FIG. 7 is a perspective view similar to FIG. 1 showing a tonneau cover held in place by the fastening system along all four edges.
Figure 9:
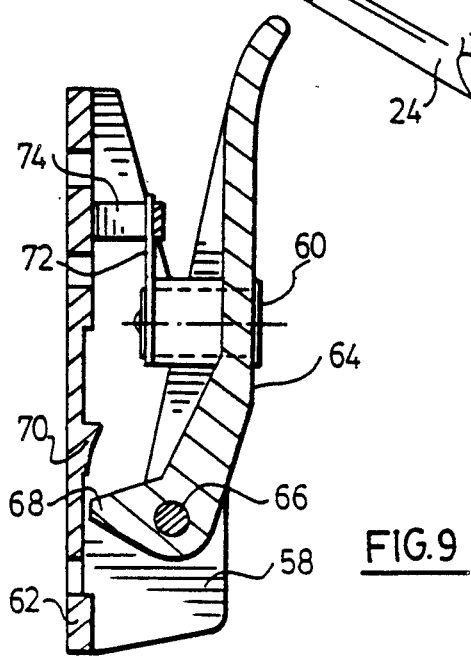
FIG. 9 is a longitudinal cross-section on the line 9—9 in FIG. 8.

Another embodiment is illustrated by FIG. 7 in which the tonneau cover is held in place by fastening system members placed around all four of its edges and all four side edges of the truck body. This cover can be completely removed from the truck body for storage, but is quickly and easily secured in place if required. However, it does not provide any security against tampering.

Figure 8:
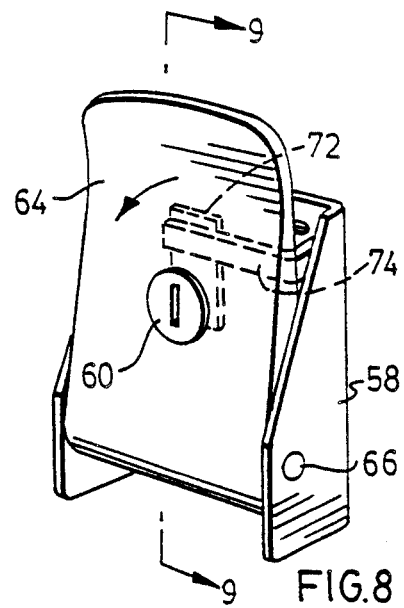
FIG. 8 is a perspective view to a larger scale of a locking cover closure latch.

FIG. 8 is a perspective drawing in detail of a rear cover lock 58 which is bolted to the outside of the pickup truck tailgate. As will be seen from FIG. 9 the lock comprises a base 62 which is bolted to the truck tailgate, and a locking arm 64 which pivots about a pin 66 to jam the respective strap 56 (not shown in these two figures) between teeth 68 and base 62; a ridge 70 on the base bites into the opposite face of the strap and provides additional retention. A key-lock 60 is incorporated in the locking arm 64 and has a latch arm 72 that engages beneath detent 74 to lock the fastener in the closed position. In use the locking arm 64 is pivoted 90° counterclockwise from the position shown in FIG. 9 to allow the strap 56 to be fed through the lock from the left as seen in the figure. When the strap has been tensioned sufficiently, the locking arm 64 is pivoted back to the position shown in FIG. 9 to jam the strap 56 between the teeth 68 and the ridge 70, the arm 64 then being locked in this position.

We claim:

1. A fastening system for securing a flexible sheet to a body, the system comprising:
   a base member;
   a cover member connected to said base member for movement between closed and open positions, the cover member in the closed position overlying and covering the base member;
   a sheet member having an edge portion thereof adapted to be sandwiched between said base and cover members when the cover member is in the overlying closed position, with one edge portion surface contacting the base member and the opposite edge portion surface contacting the cover member; and
   two separate fastening means for fastening the sheet to the body, which separate fastening means have respective fastening members cooperating with one another in the absence of the sheet member between them to fasten the base member to the cover member;
   wherein the sheet member edge portion carries on its opposite surface respective hook and loop fastening member each of which is a part of as respective one of the two separate fastening means, and the base and cover members carry respective hook and loop fastening member each of which is also a part of a respective one of the two separate fastening means cooperating with the hook and loop fastening members on the respective contacted sheet member surfaces;

the cover member in the overlying closed position with the sheet member edge portion sandwiched between the base and cover members covering the hook and loop fastening members on the cover member, the sheet member edge portion, and the base member for protection of the sandwiched cover edge portion and the hook and loop fastening members against physical damage and the deleterious effects of weathering; and the hook and loop fastening members on the cover member and the base member fastening to one another in the absence of the sheet member between them to hold the cover member in closed overlying covering engagement with the base member, so that the cover member then protects the hook and loop fastening means on the cover and base members against physical damage and the deleterious effects of weathering.

2. A fastening system as claimed in claim 1, wherein the base member is of open-mounted channel cross-section and the respective hook or loop fastening member is mounted on a subsidiary base member removably mounted in the channel with the fastening means accessible through the channel mouth.

3. A fastening system as claimed in claim 2, wherein the base member takes the form of a plurality of pieces which are butted together end to end, and the subsidiary base member is continuous to bridge the junctions between the butted pieces and thereby hold them in transverse alignment with one another.

4. A fastening system as claimed in claim 2, wherein the base member takes the form of a plurality of pieces which are butted together end to end; the subsidiary base member is continuous to bridge the junctions between the butted pieces and thereby hold them in transverse alignment with one another; and the cover member is also continuous to bridge the junctions between the butted pieces and thereby also hold them in transverse alignment with one another.

5. A fastening system as claimed in claim 1, wherein the base member takes the form of a plurality of pieces which are butted together end to end, and the cover member is continuous to bridge the junctions between the pieces and thereby hold them in transverse alignment with one another.

6. A fastening system as claimed in claim 1, wherein the said base member is an extrusion of plastic or metal.

7. A fastening system as claimed in claim 1, wherein the said cover member is an extrusion of plastic or metal.

8. A fastening system as claimed in claim 1, wherein a surface of the base member for application to a receiving surface is provided with a layer of resilient material that will be interposed between the base member and receiving surfaces.

9. A fastening system as claimed in claim 2, wherein a surface of the base member for application to a receiving surface is provided with a layer of resilient material that will be interposed between the base member and receiving surfaces.

10. A fastening system as claimed in claim 3, wherein a surface of the base member for application to a receiving surface is provided with a layer of resilient material that will be interposed between the base member and receiving surfaces.

11. A fastening system as claimed in claim 5, wherein a surface of the base member for application to a receiving surface is provided with a layer of resilient material that will be interposed between the base member and receiving surfaces.

12. A fastening system as claimed in claim 1, wherein the base or cover member is provided along one longitudinal edge with a longitudinal channel, and the cover or base member respectively is provided along the corresponding edge with a longitudinal bead engageable in the channel for pivoting connection of the base and cover members to one another.

13. A fastening system as claimed in claim 2, wherein the base or cover member is provided along one longitudinal edge with a longitudinal channel, and the cover or base member respectively is provided along the corresponding edge with a longitudinal bead engageable in the channel for pivoting connection of the base and cover members to one another.

14. A fastening system as claimed in claim 3, wherein the base or cover member is provided along one longitudinal edge with a longitudinal channel, and the cover or base member respectively is provided along the corresponding edge with a longitudinal bead engageable in the channel for pivoting connection of the base and cover members to one another.

15. A fastening system as claimed in claim 5, wherein the base or cover member is provided along one longitudinal edge with a longitudinal channel, and the cover or base member respectively is provided along the corresponding edge with a longitudinal bead engageable in the channel for pivoting connection of the base and cover members to one another.

16. A fastening system as claimed in claim 1, wherein the sheet member is a tonneau cover for a pick-up truck having the hook and loop fastening members at least along its two longer side edges.

17. A fastening system as claimed in claim 2, wherein the sheet member is a tonneau cover for a pick-up truck having the hook and loop fastening members at least along its two longer side edges.

18. A fastening system as claimed in claim 3, wherein the sheet member is a tonneau cover for a pick-up truck having the hook and loop fastening members at lest along its two longer side edges.

19. A fastening system as claimed in claim 5, wherein the sheet member is a tonneau cover for a pick-up truck having the hook and loop fastening members at least along its two longer side edges.

20. A fastening system as claimed in claim 1, wherein the sheet member is a tonneau cover for a pick-up truck having the hook and loop fastening members at least along its two longer side edges, the system including a front edge fastening means for the cover comprising a transverse bar member for mounting beneath the cover on the truck front wall edge with the cover front edge sandwiched between the bar member and the truck wall edge, and rear edge fastening means comprising strap members fastened to the tonneau rear edge and lock members on the truck rear end in which the strap members can be engaged.

21. A fastening system as claimed in claim 2, wherein the sheet member is a tonneau cover for a pick-up truck having the hook and loop fastening members at least along its two longer side edges, the system including a front edge fastening means for the cover comprising a transverse bar member for mounting beneath the cover on the truck front wall edge with the cover front edge sandwiched between the bar member and the truck wall edge, and rear edge fastening means comprising strap members fastened to the tonneau rear edge and lock members on the truck rear end in which the strap members can be engaged.

22. A fastening system as claimed in claim 3, wherein the sheet member is a tonneau cover for a pick-up truck having the hook and loop fastening members at least along its two longer side edges, the system including a front edge fastening means for the cover comprising a transverse bar member for mounting beneath the cover on the truck front wall edge with the cover front edge sandwiched between the bar member and the truck wall edge, and rear edge fastening means comprising strap members fastened to the tonneau rear edge and lock members on the truck rear end in which the strap members can be engaged.

23. A fastening system as claimed in claim 5, wherein the sheet member is a tonneau cover for a pick-up truck having the hook and loop fastening members at least along its two longer side edges, the system including a front edge fastening means for the cover on the truck front wall edge with the cover front edge sandwiched between the bar member and the truck wall edge, and rear edge fastening means comprising strap members fastened to the tonneau rear edge and lock members on the truck rear end in which the strap members can be engaged.

24. A fastening system as claimed in claim 1, wherein the sheet member is a tonneau cover for a pick-up truck having the hook and loop fastening members at least along its two longer side edges, the system including a front edge fastening means for the cover comprising a transverse bar member for mounting on the truck front wall edge having a longitudinal channel therein with the front edge of the cover engageable in the channel for retention therein, and rear edge fastening means comprising strap members fastened to the tonneau cover rear edge and lock members on the truck rear end in which the strap members can be engaged.

* * * * *